United States Patent
Symes, Jr. et al.

(10) Patent No.: US 9,892,853 B2
(45) Date of Patent: Feb. 13, 2018

(54) MID-K LTCC COMPOSITIONS AND DEVICES

(71) Applicant: Ferro Corporation, Mayfield Heights, OH (US)

(72) Inventors: Walter J. Symes, Jr., Dundee, NY (US); Gregory R. Prinzbach, Brecksville, OH (US); John J. Maloney, Solon, OH (US); James E. Henry, Carlsbad, CA (US); Orville W. Brown, Carlsbad, CA (US); Srinivasan Sridharan, Strongsville, OH (US); Yie-Shein Her, Canandaigua, NY (US); Stanley Wang, Taipei (TW); George E. Graddy, Jr., Del Mar, CA (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/301,737

(22) PCT Filed: Jun. 12, 2015

(86) PCT No.: PCT/US2015/035475
§ 371 (c)(1),
(2) Date: Oct. 4, 2016

(87) PCT Pub. No.: WO2016/007255
PCT Pub. Date: Jan. 14, 2016

(65) Prior Publication Data
US 2017/0110246 A1     Apr. 20, 2017

Related U.S. Application Data

(60) Provisional application No. 62/022,319, filed on Jul. 9, 2014.

(51) Int. Cl.
*C04B 35/465* (2006.01)
*H01G 4/12* (2006.01)
(Continued)

(52) U.S. Cl.
CPC ............. *H01G 4/129* (2013.01); *C03C 8/18* (2013.01); *C04B 35/16* (2013.01); *C04B 35/18* (2013.01);
(Continued)

(58) Field of Classification Search
CPC . H01G 4/008; H01L 41/0471; H01L 41/0478; H01L 41/1871; C04B 35/2683;
(Continued)

(56) References Cited

U.S. PATENT DOCUMENTS
4,029,605 A    6/1977 Kosiorek
4,379,319 A    4/1983 Wilson
(Continued)

FOREIGN PATENT DOCUMENTS
EP     1981046 A1    10/2008
RU     2035779 C1     5/1995
WO     2016/137790 A1  9/2016

OTHER PUBLICATIONS
International Search Report for corresponding PCT/US2015/035475 dated Oct. 15, 2015, one page.
(Continued)

*Primary Examiner* — Noah S Wiese
(74) *Attorney, Agent, or Firm* — Rankin, Hill & Clark LLP

(57) ABSTRACT

LTCC devices are produced from dielectric compositions comprising a mixture of precursor materials that, upon firing, forms a dielectric material comprising a matrix of titanates of alkaline earth metals, the matrix doped with at least one selected from rare-earth element, aluminum oxide, silicon oxide and bismuth oxide.

20 Claims, 2 Drawing Sheets

(51) Int. Cl.
*C04B 35/626* (2006.01)
*C04B 35/478* (2006.01)
*C04B 35/475* (2006.01)
*C04B 35/468* (2006.01)
*C04B 35/453* (2006.01)
*C04B 35/22* (2006.01)
*C04B 35/16* (2006.01)
*C04B 35/195* (2006.01)
*C04B 35/18* (2006.01)
*C04B 35/622* (2006.01)
*C04B 35/64* (2006.01)
*C03C 8/18* (2006.01)
*C09D 5/24* (2006.01)

(52) U.S. Cl.
CPC ............ *C04B 35/195* (2013.01); *C04B 35/22* (2013.01); *C04B 35/453* (2013.01); *C04B 35/465* (2013.01); *C04B 35/4682* (2013.01); *C04B 35/475* (2013.01); *C04B 35/478* (2013.01); *C04B 35/6263* (2013.01); *C04B 35/62218* (2013.01); *C04B 35/64* (2013.01); *C09D 5/24* (2013.01); *C04B 2235/3208* (2013.01); *C04B 2235/3215* (2013.01); *C04B 2235/3222* (2013.01); *C04B 2235/3224* (2013.01); *C04B 2235/3236* (2013.01); *C04B 2235/3298* (2013.01); *C04B 2235/3409* (2013.01); *C04B 2235/3436* (2013.01); *C04B 2235/6025* (2013.01)

(58) Field of Classification Search
CPC ............ C04B 35/4504; C04B 35/4682; C04B 35/497; C04B 35/6342
See application file for complete search history.

(56) References Cited

U.S. PATENT DOCUMENTS

| | | | |
|---|---|---|---|
| 4,540,676 A | 9/1985 | Chu et al. | |
| 4,612,600 A * | 9/1986 | Hodgkins | C04B 35/465 |
| | | | 29/25.42 |
| 4,816,430 A | 3/1989 | Chu | |
| 4,882,305 A | 11/1989 | Chu et al. | |
| 4,887,186 A * | 12/1989 | Takeda | H01G 4/008 |
| | | | 252/519.1 |
| 5,258,335 A | 11/1993 | Muralidhar et al. | |
| 5,296,426 A | 3/1994 | Bum | |
| 5,571,767 A | 11/1996 | Wilson et al. | |
| 5,601,673 A | 2/1997 | Alexander | |
| 5,661,882 A | 9/1997 | Alexander | |
| 5,714,246 A * | 2/1998 | Shaikh | C03C 8/18 |
| | | | 257/E23.113 |
| 5,790,367 A | 8/1998 | Mateika et al. | |
| 5,841,625 A | 11/1998 | Hennings et al. | |
| 5,994,253 A | 11/1999 | Sasaki et al. | |
| 6,043,174 A | 3/2000 | Maher et al. | |
| 6,078,494 A | 6/2000 | Hansen | |
| 6,185,087 B1 | 2/2001 | Park et al. | |
| 6,316,376 B1 * | 11/2001 | Hong | C04B 35/468 |
| | | | 501/136 |
| 6,723,673 B2 | 4/2004 | Maher et al. | |
| 7,161,795 B1 | 1/2007 | Megherhi et al. | |
| 7,230,817 B2 | 6/2007 | Megherhi et al. | |
| 7,521,390 B2 | 4/2009 | Symes, Jr. et al. | |
| 7,541,306 B2 | 6/2009 | Koebrugge et al. | |
| 7,858,548 B2 | 12/2010 | Symes, Jr. et al. | |
| 7,884,547 B2 * | 2/2011 | Kato | C03C 3/066 |
| | | | 313/582 |
| 7,996,969 B2 * | 8/2011 | Ohaga | H01G 4/105 |
| | | | 29/25.41 |
| 8,043,721 B2 | 10/2011 | Khadilkar et al. | |
| 8,305,731 B2 | 11/2012 | Symes, Jr. et al. | |
| 2006/0100087 A1 * | 5/2006 | Fukuta | C03C 3/062 |
| | | | 501/125 |
| 2007/0018776 A1 | 1/2007 | Tanaka et al. | |
| 2012/0015198 A1 * | 1/2012 | Masukawa | B32B 18/00 |
| | | | 428/446 |
| 2013/0162372 A1 * | 6/2013 | Sasaki | H01F 17/0013 |
| | | | 333/185 |
| 2016/0240313 A1 | 8/2016 | Symes, Jr. | |

OTHER PUBLICATIONS

Symes, Jr. et al. U.S. Appl. No. 15/310,515, filed Nov. 10, 2016, 22 pages.

* cited by examiner

MID-K LTCC COMPOSITIONS AND DEVICES

BACKGROUND OF THE INVENTION

1. Field of Invention

This invention relates to dielectric compositions, and more particularly to a doped barium-titanate based dielectric composition that can be used in low temperature co-fired ceramic (LTCC) applications with noble metal metallizations.

2. Description of Related Art

The state of the art materials used in LTCC system used in wireless applications, include dielectrics with K 4-8 and with Q factors greater than 500 at the measuring frequency of 1 MHZ.

SUMMARY OF THE INVENTION

There is growing demand for dielectric materials with higher K values from 10 to 120 with Q values greater than 500 (higher the better). There is also a need for these materials to be co-fireable (without warping and to maintain good adhesion) with state of the art LTCC dielectrics, specifically L8 tape.

The invention relates to dielectric materials with Q values of greater than 500 and greater than 1000, after firing.

The invention relates to (a) dielectric materials compositions suitable for Mid K LTCC applications, (b) dielectric materials firing at a peak temperature of 875° C. or less, (c) dielectric materials that can fire stand alone as well as co-firing with state of the art BaO—CaO—$B_2O_3$—$Al_2O_3$—$SiO_2$—$TiO_2$ tape dielectrics with good adhesion and no warping or undue reactions at the interfaces.

The dielectric composition of the invention comprises a uniform dense microstructure of grains having an average diameter ($D_{50}$ particle size) of about 0.5 to about 5 microns. A uniform and dense grain microstructure is critical in achieving high reliability multilayer capacitors having dielectric layers thinner than 5 microns.

In one embodiment, the invention relates to a composition comprising a mixture of precursor materials that, upon firing, forms a dielectric material comprising a barium-titanate or calcium-titanate matrix doped with at least one rare-earth element.

In one embodiment, the invention relates to a composition comprising a mixture of precursor materials that, upon firing, forms a dielectric material comprising a matrix of a titanate of an alkaline earth metal such as barium-titanate and/or calcium-titanate, the matrix doped with at least one selected from the group consisting of bismuth, neodymium, samarium, gadolinium and lanthanum.

In another embodiment, the invention relates to a lead-free and cadmium-free dielectric paste composition, comprising, a solids portion comprising:
from about 0.5 wt % to about 50 wt % (BaO+CaO+SrO+MgO);
from about 0.1 wt % to about 60 wt % ($Al_2O_3+B_2O_3$);
from about 0.1 wt % to about 60 wt % ($SiO_2+TiO_2+ZrO_2$)
from about 0 wt % to about 40 wt % $Bi_2O_3$;
from about 0 wt % to about 35 wt % ($Nd_2O_3+Gd_2O_3+La_2O_3+Sm_2O_3$);
from about 0 wt % to about 10 wt % ZnO;
from about 0 wt % to about 10 wt % CuO; and
from about 0 wt % to about 8 wt % LiF.

In another embodiment, the invention relates to a lead-free and cadmium-free dielectric paste composition, comprising, a solids portion comprising:
from about 5 wt % to about 25 wt % (BaO+CaO+SrO+MgO);
from about 0.5 wt % to about 45 wt % ($Al_2O_3+B_2O_3$);
from about 3 wt % to about 58 wt % ($SiO_2+TiO_2+ZrO_2$)
from about 1 wt % to about 30 wt % $Bi_2O_3$;
from about 0 wt % to about 30 wt % ($Nd_2O_3+Gd_2O_3+La_2O_3+Sm_2O_3$);
from about 0.1 wt % to about 10 wt % ZnO;
from about 0.1 wt % to about 10 wt % CuO; and
from about 0.1 wt % to about 5 wt % LiF.

In another embodiment, the invention relates to a lead-free and cadmium-free dielectric paste composition, comprising, a solids portion comprising:
from about 14 wt % to about 27 wt % (BaO+CaO+SrO+MgO);
from about 1 wt % to about 43 wt % ($Al_2O_3+B_2O_3$);
from about 21 wt % to about 58 wt % ($SiO_2+TiO_2+ZrO_2$)
from about 8 wt % to about 20 wt % $Bi_2O_3$;
from about 0.1 wt % to about 20 wt % ($Nd_2O_3+Gd_2O_3+La_2O_3+Sm_2O_3$);
from about 0.1 wt % to about 5 wt % ZnO;
from about 0.1 wt % to about 5 wt % CuO; and
from about 0.1 wt % to about 3 wt % LiF.

In another embodiment, the invention relates to a lead-free and cadmium-free dielectric paste composition, comprising: a solids portion comprising: from about 10 wt % to about 28 wt % (BaO+CaO+SrO+MgO);
from about 1 wt % to about 13 wt % ($Al_2O_3+B_2O_3$);
from about 22 wt % to about 58 wt % ($SiO_2+TiO_2+ZrO_2$)
from about 9 wt % to about 19 wt % $Bi_2O_3$;
from about 0 wt % to about 28 wt % ($Nd_2O_3+Gd_2O_3+La_2O_3+Sm_2O_3$);
from about 1 wt % to about 5 wt % ZnO;
from about 0.1 wt % to about 3 wt % CuO; and
from about 0.5 wt % to about 3 wt % LiF.

In another embodiment, the invention relates to a lead-free and cadmium-free dielectric paste composition, comprising, a solids portion comprising:
from about 5 wt % to about 50 wt % (BaO+CaO+SrO+MgO);
from about 0.1 wt % to about 50 wt % ($Al_2O_3+B_2O_3$);
from about 0.1 wt % to about 50 wt % ($SiO_2+TiO_2+ZrO_2$); and
from about 0.1-40 wt % $Bi_2O_3$.

This embodiment may further comprise at least one selected from the group consisting of:
from about 0.1 wt % to about 10 wt % ZnO;
from about 0.1 wt % to about 30 wt % ($Nd_2O_3+Gd_2O_3+La_2O_3+Sm_2O_3$);
from about 0.1 wt % to about 10 wt % CuO; and
from about 0.1 wt % to about 10 wt % LiF.

In another embodiment, the invention relates to a lead-free and cadmium-free dielectric paste composition, comprising, a solids portion comprising:
from about 0.5 wt % to about 50 wt % BaO;
from about 0 wt % to about 40 wt % CaO;
from about 0 wt % to about 10 wt % SrO;
from about 0 wt % to about 10 wt % ZnO;
from about 0.1 wt % to about 20 wt % $B_2O_3$;
from about 0 wt % to about 40 wt % $Al_2O_3$;
from about 0 wt % to about 40 wt % $SiO_2$;
from about 1 wt % to about 70 wt % $TiO_2$;
from about 0 wt % to about 30 wt % $Bi_2O_3$;
from about 0 to about 30 wt % $Nd_2O_3$;

from about 0 to about 40 wt % $Sm_2O_3$;
from about 0 to about 10 wt % CuO; and
from about 0 to about 10 wt % LiF.

In an alternate of this embodiment, the paste includes at least one selected from the group consisting of:
from about 0.1 wt % to about 10 wt % SrO;
from about 0.1 wt % to about 10 wt % ZnO;
from about 0.1 wt % to about 40 wt % $Al_2O_3$;
from about 0.1 wt % to about 40 wt % $SiO_2$;
from about 0.1 wt % to about 30 wt % $Bi_2O_3$;
from about 0.1 to about 30 wt % $Nd_2O_3$;
from about 0.1 to about 40 wt % $Sm_2O_3$;
from about 0.1 to about 10 wt % CuO; and
from about 0.1 to about 10 wt % LiF.

In another embodiment, the invention relates to a lead-free and cadmium-free dielectric paste composition, comprising, a solids portion comprising:
from about 5 wt % to about 25 wt % BaO;
from about 0 wt % to about 20 wt % CaO;
from about 0 wt % to about 5 wt % SrO;
from about 0 wt % to about 7 wt % ZnO;
from about 0.5 wt % to about 25 wt % $B_2O_3$;
from about 0 wt % to about 35 wt % $Al_2O_3$;
from about 1 wt % to about 35 wt % $SiO_2$;
from about 2 wt % to about 65 wt % $TiO_2$;
from about 0 wt % to about 20 wt % $Bi_2O_3$;
from about 0 wt % to about 25 wt % $Nd_2O_3$;
from about 0 wt % to about 35 wt % $Sm_2O_3$;
from about 0 wt % to about 5 wt % CuO; and
from about 0 wt % to about 5 wt % LiF.

In an alternate of this embodiment, the paste includes at least one selected from the group consisting of:
from about 0.1 wt % to about 20 wt % CaO;
from about 0.1 wt % to about 5 wt % SrO;
from about 0.1 wt % to about 7 wt % ZnO;
from about 0.1 wt % to about 35 wt % $Al_2O_3$;
from about 0.1 wt % to about 20 wt % $Bi_2O_3$;
from about 0.1 wt % to about 25 wt % $Nd_2O_3$;
from about 0.1 wt % to about 35 wt % $Sm_2O_3$;
from about 0.1 wt % to about 5 wt % CuO; and
from about 0.1 wt % to about 5 wt % LiF.

In another embodiment, the invention relates to a lead-free and cadmium-free dielectric paste composition, comprising, a solids portion comprising:
from about 15 wt % to about 25 wt % BaO;
from about 0 wt % to about 15 wt % CaO;
from about 0 wt % to about 3 wt % SrO;
from about 0 wt % to about 6 wt % ZnO;
from about 1 wt % to about 15 wt % $B_2O_3$;
from about 0 wt % to about 30 wt % $Al_2O_3$;
from about 0 wt % to about 30 wt % $SiO_2$;
from about 3 wt % to about 60 wt % $TiO_2$;
from about 0 wt % to about 17 wt % $Bi_2O_3$;
from about 0 wt % to about 20 wt % $Nd_2O_3$;
from about 0 wt % to about 30 wt % $Sm_2O_3$;
from about 0 wt % to about 3 wt % CuO; and
from about 0 wt % to about 3 wt % LiF.

In an alternate of this embodiment, the paste includes at least one selected from the group consisting of:
from about 0.1 wt % to about 15 wt % CaO;
from about 0.1 wt % to about 3 wt % SrO;
from about 0.1 wt % to about 6 wt % ZnO;
from about 0.1 wt % to about 30 wt % $Al_2O_3$;
from about 0.1 wt % to about 30 wt % $SiO_2$;
from about 0.1 wt % to about 17 wt % $Bi_2O_3$;
from about 0.1 wt % to about 20 wt % $Nd_2O_3$;
from about 0.1 wt % to about 30 wt % $Sm_2O_3$;
from about 0.1 wt % to about 3 wt % CuO; and
from about 0.1 wt % to about 3 wt % LiF.

In another embodiment, the invention relates to a lead-free and cadmium-free dielectric paste composition, comprising, a solids portion comprising:
from about 0.5 wt % to about 50 wt % BaO;
from about 0.5 wt % to about 60 wt % $TiO_2$;
from about 0.1 wt % to about 40 wt % $Bi_2O_3$;
from about 0.1 wt % to about 30 wt % $SiO_2$;
from about 0.1 wt % to about 30 wt % ZnO;
from about 0.1 wt % to about 40 wt % $B_2O_3$;
from about 0.1 wt % to about 30 wt % CuO; and
from about 0.1 wt % to about 30 wt % LiF.

In another embodiment, the invention relates to a lead-free and cadmium-free dielectric paste composition, comprising, a solids portion comprising:
from about 5 wt % to about 40 wt % BaO;
from about 10 wt % to about 60 wt % $TiO_2$;
from about 5 wt % to about 25 wt % $Bi_2O_3$;
from about 0.1 wt % to about 15 wt % $SiO_2$;
from about 0.1 wt % to about 15 wt % ZnO;
from about 0.1 wt % to about 15 wt % $B_2O_3$;
from about 0.1 wt % to about 15 wt % CuO and from about 0.1 wt % to about 15 wt % LiF.

In an alternative of this embodiment,

In another embodiment, the invention relates to a lead-free and cadmium-free dielectric paste composition, comprising, a solids portion comprising:
from about 15 wt % to about 30 wt % BaO;
from about 40 wt % to about 57 wt % $TiO_2$;
from about 8 wt % to about 18 wt % $Bi_2O_3$;
from about 0.1 wt % to about 5 wt % $SiO_2$;
from about 0.1 wt % to about 5 wt % ZnO;
from about 0.1 wt % to about 5 wt % $B_2O_3$;
from about 0.1 wt % to about 5 wt % CuO; and
from about 0.1 wt % to about 5 wt % LiF.

In another embodiment, the invention relates to a lead-free and cadmium-free dielectric paste composition, comprising a solids portion comprising:
from about 12 wt % to about 18 wt % BaO;
from about 0.1 wt % to about 5 wt % CaO;
from about 0.1 wt % to about 7 wt % ZnO;
from about 0.1 wt % to about 5 wt % $B_2O_3$;
from about 30 wt % to about 40 wt % $TiO_2$;
from about 8 wt % to about 16 wt % $Bi_2O_3$;
from about 0 wt % to about 3 wt % CuO; and
from about 0.1 wt % to about 3 wt % LiF.

In another embodiment, the invention relates to a fired electric or electronic component comprising, prior to firing any dielectric paste disclosed herein, together with a conductive paste comprising prior to firing: (a) 60-90 wt % Ag+Pd+Pt+Au, (b) 1-10 wt % of an additive selected from the group consisting of silicides, carbides, nitrides, and borides of transition metals, (c) 0.5-10 wt % of at least one glass frit, and (d) 10-40 wt % of an organic portion. The electric or electronic component may be high Q resonators, band pass filters, wireless packaging systems, and combinations thereof.

In another embodiment, the invention relates to a method of forming an electronic component comprising: applying any dielectric paste disclosed herein to a substrate; and firing the substrate at a temperature sufficient to sinter the dielectric material.

In another embodiment, the invention relates to a method of forming an electronic component comprising laminating a tape to the dielectric paste. The tape may comprise, a solids portion comprising 5-25 wt % BaO, 1-10 wt % CaO, 2-13 wt % $B_2O_3$, 30-55 wt % $Al_2O_3$, 15-40 wt % $SiO_2$, and 0.01-13 wt % $TiO_2$.

A plurality of embodiments involve method of co-firing at least one layer of any lead-free and cadmium-free dielectric material or paste disclosed herein in combination with at least one alternating separate layer of tape or paste having a dielectric constant less than 10 to form a multi-layer substrate wherein alternating layers have differing dielectric constants.

In another embodiment, the invention relates to a method of forming an electronic component comprising applying particles of any dielectric material disclosed herein to a substrate and firing the substrate at a temperature sufficient to sinter the dielectric material. It is to be understood that each numerical value herein (percentage, temperature, etc) is presumed to be preceded by "about."

In another embodiment, the invention relates to a fired dielectric material or paste having a dielectric constant K of 10 to 100, preferably 20 to 80.

In any embodiment herein the dielectric material may comprise different phases, for example crystalline and amorphous in any ratio, for example 1:99 to 99:1, (crystalline: amorphous) expressed in either mol % or wt %, Other ratios include 10:90, 20:80, 30:70, 40:60:50:50, 60:40, 70:30, 80:20 and 90:10 as well as all values in between. In one embodiment the dielectric paste includes 10-30 wt % crystalline dielectric and 70-90 wt % amorphous dielectric.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

DETAILED DESCRIPTION OF THE INVENTION

Figure 1:
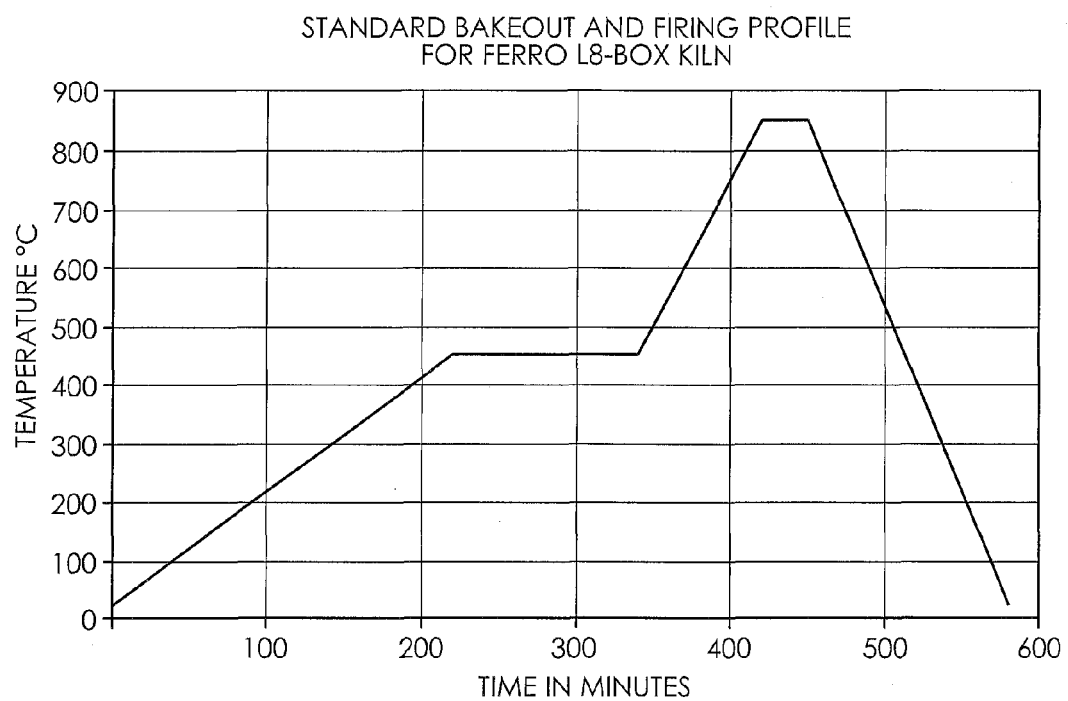
FIG. 1 graphically depicts a firing profile for a dielectric of the invention.

LTCC (Low Temperature Co-fired Ceramic), is a multilayer, glass ceramic substrate technology which is co-fired with low resistance metal conductors, such as Ag, Au, Pt or Pd, or combinations thereof, at relatively low firing temperatures (less than 1000° C.). Sometimes it is referred to as "Glass Ceramics" because its main composition may consist of glass and alumina or other ceramic fillers. Some LTCC formulations are recrystallizing glasses. Glasses herein may be provided in the form of frits which may be formed in situ or added to a composition. In some situations, base metals such as nickel and its alloys may be used, ideally in non-oxidizing atmospheres, such as oxygen partial pressures of $10^{-12}$ to $10^{-8}$ atmospheres. A "base metal" is any metal other than gold, silver, palladium, and platinum. Alloying metals may include manganese, chromium, cobalt and aluminum.

A tape cast from a slurry of dielectric material is cut, and holes known as vias are formed to enable electrical connection between layers. The vias are filled with a conductive paste. Circuit patterns are then printed, along with co-fired resistors as needed. Multiple layers of printed substrates are stacked. Heat and pressure are applied to the stack to bond layers together. Low temperature (<1000° C.) sintering is then undertaken. The sintered stacks are sawn to final dimensions and post fire processing completed as needed.

Multilayer structures useful in automotive applications may have about 5 ceramic layers, for example 3-7 or 4-6. In RF applications, a structure may have 10-25 ceramic layers. As a wiring substrate, 5-8 ceramic layers may be used.

Dielectric Pastes.

A paste for forming the dielectric layers can be obtained by mixing an organic vehicle with a raw dielectric material, as disclosed herein. Also useful are precursor compounds (carbonates, nitrates, sulfates, phosphates) that convert to such oxides and composite oxides upon firing, as stated herein. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material (as disclosed elsewhere herein) is generally used in powder form having a mean particle size of about 0.1 to about 3 microns, and more preferably about 1 micron or less.

Organic Vehicle.

The pastes herein include an organics portion. The organics portion is or includes an organic vehicle, which is a binder in an organic solvent or a binder in water. The choice of binder used herein is not critical; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich.

No particular limit is imposed on the organics portion of the dielectric pastes of the invention. In one embodiment the dielectric pastes of the invention include from about 10 wt % to about 40 wt % of the organics portion, or about 10 wt % to about 30 wt % organics portion. Alternately, the paste may contain about 1 to 5 wt % of the binder and about 10 to 50 wt % of the organic solvent, with the balance being the dielectric component (solids portion). In one embodiment, the dielectric paste of the invention includes from about 60 to about 90 wt % of solids portion elsewhere disclosed, and from about 10 wt % to about 40 wt % of the organics portion described in this and the preceding paragraph. If desired, the pastes of the invention may contain up to about 10 wt % of other additives such as dispersants, plasticizers, dielectric compounds, and insulating compounds.

Filler.

In order to minimize expansion mismatch between tape layers of differing dielectric compositions, fillers such as cordierite, alumina, zircon, fused silica, aluminosilicates and combinations thereof may be added to one or more dielectric pastes herein in an amount of 1-30 wt %, preferably 2-20 wt % and more preferably 2-15 wt %.

Firing.

The dielectric stack (two or more layers) is then fired in an atmosphere, which is determined according to the type of conductor in the internal electrode layer-forming paste. Firing is conducted at about 700 to about 1000° C., preferably about 800 to about 900° C., more preferably about 825 to about 875° C. The firing may be conducted in air. Alternately, the firing atmosphere may have an oxygen partial pressure of about $10^{-12}$ to about $10^{-8}$ atm. When the oxygen concentration is monitored, sintering at a partial pressure lower than about $10^{-12}$ atm should be avoided, since at such low pressures the conductor can be abnormally sintered and may become disconnected from the dielectric layers; at oxygen partial pressures above about $10^{-8}$ atm, the internal electrode layers may be oxidized. However, reducing atmospheres ($H_2$, $N_2$ or $H_2/N_2$) can undesirably reduce $Bi_2O_3$ from a dielectric paste to metallic bismuth.

Applications for the LTCC compositions and devices disclosed herein include band pass filters, (high pass or low pass), wireless transmitters and receivers for telecommunications including cellular applications, power amplifier modules (PAM), RF front end modules (FEM), WiMAX2 modules, LTE-advanced modules, transmission control units (TCU), electronic power steering (EPS), engine management systems (EMS), various sensor modules, radar modules, pressure sensors, camera modules, small outline tuner modules, thin profile modules for devices and components, and IC tester boards. Band-pass filters contain two major parts, one a capacitor and the other an inductor. Low K material is good for designing the inductor, but not suitable for designing a capacitor due the requirement for more active area to generate sufficient capacitance. High K material will result in the opposite. The inventors have discovered that Low K (4-8) LTCC material together with Mid K (10-100) LTCC material can be co-fired and put into a single component, low K materials can be used to design inductor area and high K material can be used to design capacitor area to optimize performance.

EXAMPLES

The following examples are provided to illustrate preferred aspects of the invention and are not intended to limit the scope of the invention.

Overview.

Evaluation of individual materials; L8, L20, L40 and ULF840.

Example 1. L8 Powder

TABLE 1

L8 VWG powder properties

| Property | Value |
|---|---|
| Thermal Expansion (RT-260° C.) (×10–7/° C.) | 50.0 |
| Density (g/cc) | 3.35 |
| Surface Area (m2/g) | 3.1 |
| K Value | 7.4 |
| Q Value | >1000 |
| Particle Size (microns) | |
| $D_{10}$ | 1.30 |
| $D_{50}$ | 2.50 |
| $D_{90}$ | 5.80 |

L8VWG tape samples were produced using a slurry consisting of a PVB resin system and standard doctor blade casting. Laminated tape samples were produced using 3000 psi iso-static lamination conditions. The laminated parts were fired at temperatures of 825° C., 850° C. and 875° C. with dwell times of 15, 30 and 60 minutes to establish a firing range. The density of the green laminate, the fired density, measured XY Shrinkage, and % Theoretical Density are presented in the table below.

TABLE 2

L8 VWG Tape Laminate Firing Matrix

| Firing Temp (ramp - soak) | Laminate Density (g/cc) | Fired density (g/cc) | % XY Shrinkage | % Theoretical Density |
|---|---|---|---|---|
| 825° C. 8° C. Ramp 15 Min Soak | 2.19 | 3.15 | 14.4 | 94.0 |
| 825° C. 8° C. Ramp 30 min Soak | 2.19 | 3.14 | 14.2 | 93.7 |
| 825° C. 8° C. Ramp 60 Min Soak | 2.19 | 3.12 | 14.2 | 93.1 |
| 850° C. 8° C. ramp 15 min Soak | 2.19 | 3.13 | 14.2 | 93.4 |
| 850° C. 8° C. ramp 30 min Soak | 2.19 | 3.12 | 14.3 | 93.1 |
| 850° C. 8° C. ramp 60 min Soak | 2.18 | 3.09 | 14.2 | 92.2 |
| 875° C. 8° C. ramp 15 min Soak | 2.18 | 3.08 | 14.0 | 91.2 |
| 875° C. 8° C. ramp 30 min Soak | 2.19 | 3.08 | 14.1 | 91.9 |
| 875° C. 8° C. ramp 60 min Soak | 2.18 | 3.06 | 14.0 | 91.0 |

Example 2

L20 dielectric material was prepared according the formulation in covered by the ranges in Table 3 below.

TABLE 3

L20 dielectric formulation

| Oxide | Wt % |
|---|---|
| BaO | 0.5-50 |
| CaO | 0.1-40 |
| B2O3 | 0.1-50 |
| Al2O3 | 0-20 |
| SiO2 | 0.1-40 |
| TiO2 | 1-40 |
| Bi2O3 | 0.1-40 |
| Nd2O3 | 0.1-30 |

Electrical and physical properties of the L20 dielectric material are presented in the table 4, below.

TABLE 4

Electrical and physical properties of L20 dielectric material of the invention.

| Property | Value |
|---|---|
| Thermal Expansion (RT-260° C. × 10–7/° C.) | 87.0 |
| Density g/cc | 4.34 |
| K Value | 22.2 |
| Q Value | 1050 |
| Particle Size (microns) | |
| $D_{10}$ | 1.69 |
| $D_{50}$ | 2.81 |
| $D_{90}$ | 4.80 |
| $D_{95}$ | 5.57 |

TABLE 5

L20 Slurry Produced using B74001 Phthalate Free Binder cast on 2 mil white polyethylene terephthalate to form a tape. The L20 tape has the following properties:

| Tape Thickness (microns) | Green Sheet Density (g/cc) | Laminate Density (g/cc) | Tensile Properties Stress at Break, kPa |
|---|---|---|---|
| 75 | 2.51 | 2.92 | 4500 |

TABLE 6

Tensile Strength Data of L20 Tape are presented in the table below.

| Run | Break (Automatic Load Drop - Lbf) | Tensile Stress at Break (Automatic Load Drop -kPa) | Modulus (Automatic Young's - ksi) |
|---|---|---|---|
| 1 | 0.89 | 4173 | 7.73 |
| 2 | 1.02 | 4676 | 7.40 |
| 3 | 1.17 | 5267 | 7.81 |
| 4 | 0.63 | 2917 | 7.51 |
| 5 | 0.99 | 4708 | 7.62 |
| 6 | 0.93 | 4344 | 9.48 |
| 7 | 0.87 | 3937 | 8.12 |
| 8 | 0.67 | 6162 | 10.22 |
| 9 | 1.07 | 4830 | 7.43 |
| 10 | 0.977 | 4596 | 8.68 |
| 11 | 1.15 | 5196 | 12.85 |
| 12 | 1.04 | 4940 | 8.44 |
| 13 | 1.03 | 4757 | 7.36 |
| 14 | 0.92 | 4451 | 7.92 |
| 15 | 1.22 | 5589 | 9.37 |
| Max | 1.22 | 5589 | 12.85 |
| Mean | 0.97 | 4501 | 8.53 |
| Min | 0.63 | 2917 | 7.36 |
| Std Dev | 0.16 | 733.91 | 1.48 |

L20 tape laminates were produced for determination of Fired Density, XY Shrinkage and Camber. L20 tape laminates of approximately 0.040" thick produced at 3000 psi were green cut to 0.5"×0.5".

Laminates of L20 were fired at 850° C. for 30 minutes using a Sierra therm kiln with the profile shown in FIG. 1. Parts less than 50 mils (1.27 mm) thick generally use a 2° C. per minute ramp rate for bakeout depending on the material loading. The bakeout firing ramp rate for thicker parts over 50 mils (1.27 mm) is 1° C. per minute. It is advantageous to provide an air exchange rate of 50 air exchanges per hour at least through binder burnout. The firing ramp rate is 4 to 8° C. per minute from 450° C. to 850° C. with a 30 minute soak at 850° C.

Firing Results.

L20 green laminates were fired on $ZrO_2$ felt. Parts were also fired using C12 carbon setter tape on the $ZrO_2$ setter.

TABLE 7

Firing Data for Blank laminates.

| L20 firing | Fired Density | % Theoretical Density | % XY Shrinkage | % Camber |
|---|---|---|---|---|
| 850° C. - 30 min | 3.91 g/cc | 90.1 | 15.3 | 1.02 |

There was no measurable camber for fired L20-1210 size chips.

Electrical Properties. A post-fire step (850° C., 60 minutes—belt furnace) with a post fireable Au surface conductor (CN30-025JH) was used to create conductors on the fired L20 dielectric and form single plate capacitors for determining capacitance, % df, K and Q. An HP4192A LF impedance meter was used at a setting of 1 MHz as seen in Table 8:

TABLE 8

| Capacitance pFd | % df | K value | Q |
|---|---|---|---|
| 26.4 | 0.0009 | 21.2 | 1111 |

Example 3

L40 tape was produced using a PVB resin system and a standard doctor blade tape casting process.

TABLE 9

L40 Tape Properties.

| Tape Thickness - microns | Green Sheet density (g/cc) | Laminate Density (g/cc) |
|---|---|---|
| 35 | 2.17 | 2.87 |

L40 tape Laminates were produced for determination of fired density and XY shrinkage were 0.034" thick produced under 3000 psi and green cut to 0.5"×0.5". The L40 laminates were fired at 850° C. for 30 minutes using a Sierra Therm Kiln according to the profile in FIG. 1, above.

TABLE 10

Firing results for L40 blank laminates:

| L40 firing profile | Fired density - g/cc | % XY shrinkage |
|---|---|---|
| 850° C. 30 minutes | 4.26 | 20.8 |

Electrical Properties; a post-fire step (850° C., 60 minutes—belt furnace) with a post fireable Au surface conductor (CN30-025JH) was used to create conductors on the fired L40 dielectric and form single plate capacitors for determining capacitance, % df, K and Q. An HP4192A LF impedance meter was used at a setting of 1 MHz:

TABLE 11

L40 Electrical Data

| Capacitance pFd | % df | K value | Q |
|---|---|---|---|
| 53.02 | 0.0005 | 46.1 | 2000 |

Example 4

ULF840 is a commercially available Dielectric powder with the following typical properties as shown in Table 12

TABLE 12

| Property | Value |
|---|---|
| Density g/cc | 5.60 |
| K Value | 84 |
| Q Value | >3000 |
| Particle Size (microns) | |
| $D_{10}$ | 0.4 |
| $D_{50}$ | 0.7 |
| $D_{90}$ | 1.1 |
| Surface Area (m2/g) | 6.2 |

ULF 840 tape produced for this evaluation was made using a PVB based resin system, as shown in Table 13.

TABLE 13

| Tape thickness mils | Green sheet density g/cc | Fired density g/cc |
|---|---|---|
| 1.16 | 2.63 | 5.60 |

Example 5

The inventors investigated of co-firing Ferro's L8 LTCC dielectric material with different K value dielectric materials within a laminated structure of green tapes. Initially three materials have been selected (Ferro's ULF840, L20, and L40) as candidates to evaluate co-firing compatibility with L8. The initial work involves co-firing tape samples (using the standard L8 850° C. firing profile) of the four materials for determination of co-fire compatibility.

Materials:
1) L8—10 mil thickness tape
2) ULF840—1.16 mils thickness tape
3) L40—1.27 mil thickness tape
4) L20—3 mil thickness tape Procedure:
1) Laminates were produced in a 2"×2" format in the following manner:
   A. Three sets of laminates using L8-tape as the base material with separate parts made adding a single layer of ULF840, L20 and L40 to the L8 base/tape material. The combined materials and part thicknesses are comprised of >90% L8 tape.
2) Using an isostatic press, laminate at 3000 psi at 70° C.–10 minute dwell with no pressure followed by 10 minutes under pressure.
3). Fire at 850° C. and 875° C. with a standard L8 profile (bake out, ramps and dwell time) as shown in FIG. 1. Observe fired parts for camber or distortion and measure if applicable

TABLE 14

Green Sheet Density

| Material | Green Sheet Density g/cc |
|---|---|
| L8-10 | 1.89 |
| ULF 840 | 2.63 |
| LTCC40 | 2.38 |
| L20 | 2.51 |

Photomicrographs (not shown) for the three combinations indicate excellent flatness for L8/L20 and the need for adjustments for L8/ULF840 and L8/L40.

Figure 2:
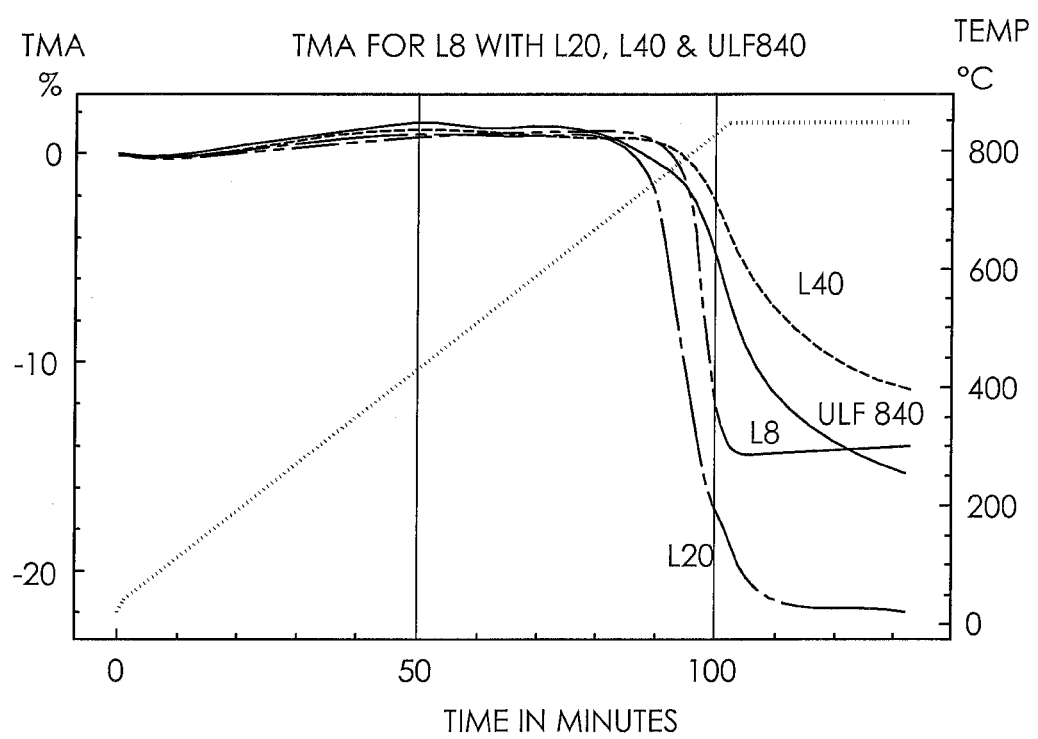
FIG. 2 graphically depicts thermomechanical analysis for dielectrics of the invention.

FIG. 2 displays Thermomechanical Analysis (TMA) data comparing L8 with ULF 840, L20 and L40.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A lead-free and cadmium-free dielectric paste composition comprising a solids portion comprising:
   from about 15 wt % to about 25 wt % BaO;
   from about 0 wt % to about 15 wt % CaO;
   from about 0 wt % to about 3 wt % SrO;
   from about 0 wt % to about 6 wt % ZnO;
   from about 1 wt % to about 15 wt % $B_2O_3$;
   from about 0 wt % to about 30 wt % $Al_2O_3$;
   from about 0 wt % to about 30 wt % $SiO_2$;
   from about 3 wt % to about 60 wt % $TiO_2$;
   from about 0 wt % to about 17 wt % $Bi_2O_3$;
   from about 0 to about 20 wt % $Nd_2O_3$;
   from about 0 to about 30 wt % $Sm_2O_3$;
   from about 0 to about 3 wt % CuO; and
   from about 0 to about 3 wt % LiF.

2. A lead-free and cadmium-free dielectric paste composition comprising a solids portion comprising:
   from about 5 wt % to about 40 wt % BaO;
   from about 10 wt % to about 60 wt % $TiO_2$;
   from about 5 wt % to about 25 wt % $Bi_2O_3$;
   from about 0.1 wt % to about 15 wt % $SiO_2$;
   from about 0.1 wt % to about 15 wt % ZnO;
   from about 0.1 wt % to about 15 wt % $B_2O_3$;
   from about 0.1 wt % to about 15 wt % CuO; and
   from about 0.1 wt % to about 15 wt % LiF.

3. The lead-free and cadmium-free dielectric paste composition of claim 2, comprising a solids portion comprising:
   from about 15 Wt % to about 30 wt % BaO;
   from about 40 wt % to about 57 wt % $TiO_2$;
   from about 8 wt % to about 18 wt % $Bi_2O_3$;
   from about 0.1 wt % to about 5 wt % $SiO_2$;
   from about 0.1 wt % to about 5 wt % ZnO;
   from about 0.1 wt % to about 5 wt % $B_2O_3$;
   from about 0.1 wt % to about 5 wt % CuO; and
   from about 0.1 wt % to about 5 wt % LiF.

4. A lead-free and cadmium-free dielectric paste composition, comprising a solids portion comprising:
   from about 12 wt % to about 18 wt % BaO;
   from about 0.1 wt % to about 5 wt % CaO;
   from about 0.1 wt % to about 7 wt % ZnO;
   from about 0.1 wt % to about 5 wt % $B_2O_3$;
   from about 30 wt % to about 40 wt % $TiO_2$;
   from about 8 wt % to about 16 wt % $Bi_2O_3$;

from about 0 wt % to about 3 wt % CUD; and
from about 0.1 wt % to about 3 wt % LiF.

5. A fired electric or electronic component comprising a lead-free and cadmium-free dielectric paste composition together with
 i. a conductive paste comprising prior to firing:
  a. 60-90 wt % Ag+Pd+Pt+Au,
  b. 1-10 wt % of an additive selected from the group consisting of silicides, carbides, nitrides, and borides of transition metals,
  c. 0.5-10 wt % of at least one glass frit,
  d. 10-40 wt % of an organic portion,
 ii. wherein the lead-free and cadmium-free dielectric paste composition comprises a solids portion comprising:
  a. from about 0.5 wt % to about 50 wt % (BaO+CaO+SrO+MgO);
  b. from about 0.1 wt % to about 60 wt % ($Al_2O_3+B_2O_3$);
  c. from about 0.1 wt % to about 60 wt % ($SiO_2+TiO_2+ZrO_2$);
  d. from about 0 wt % to about 40 wt % $Bi_2O_3$;
  e. from about 0 wt % to about 35 wt % ($Nd_2O_3+Gd_2O_3+La_2O_3+Sm_2O_3$);
  f. from about 0 wt % to about 10 wt % ZnO;
  q. from about 0 wt % to about 10 wt % CuO; and
  h. from about 0 wt % to about 8 wt % LiF.

6. The fired electric or electronic component of claim 5, wherein the solids portion comprises:
  a. from about 0.5 wt % to about 50 wt % (BaO+CaO+SrO+MgO);
  b. from about 0.1 wt % to about 60 wt % ($Al_2O_3+B_2O_3$);
  c. from about 0.1 wt % to about 60 wt % ($SiO_2+TiO_2+ZrO_2$);
  d. from about 0 wt % to about 40 wt % $Bi_2O_3$;
  e. from about 0 wt % to about 35 wt % ($Nd_2O_3+Gd_2O_3+La_2O_3+Sm_2O_3$);
  f. from about 0 wt % to about 10 wt % ZnO;
  g. from about 0 wt % to about 10 wt % CuO; and
  h. from about 0 wt % to about 8 wt % LiF.

7. A method of producing an LTCC device comprising:
 providing at least one substrate bearing a tape comprising a lead-free and cadmium free dielectric paste composition, comprising a solids portion comprising:
  from about 0.5 wt % to about 50 wt % (BaO+CaO+SrO+MgO);
  from about 0.1 wt % to about 60 wt % ($Al_2O_3+B_2O_3$);
  from about 0.1 wt % to about 60 wt % ($SiO_2+TiO_2+ZrO_2$);
  from about 0 wt % to about 40 wt % $Bi_2O_3$;
  from about 0 wt % to about 35 wt % ($Nd_2O_3+Gd_2O_3+La_2O_3+Sm_2O_3$);
  from about 0 wt % to about 10 wt % ZnO;
  from about 0 wt % to about 10 wt % CuO; and
  from about 0 wt % to about 8 wt % LiF;
 forming at least one via in the tape,
 filling the at least one via with a conductive paste comprising:
  a. 60-90 wt % Ag+Pd+Pt+Au,
  b. 1-10 wt % of an additive selected from the group consisting of silicides, carbides, nitrides, and borides of transition metals,
  c. 0.5-10 wt % of at least one glass frit, and
  d. 10-40 wt % of an organic portion, and
 firing the tape and conductive paste at a temperature up to 1000° C.

8. The fired electric or electronic component of claim 5, wherein the solids portion comprises:
 from about 5 wt % to about 25 wt % (BaO+CaO+SrO+MgO),
 from about 0.5 wt % to about 45 wt % ($Al_2O_3+B_2O_3$),
 from about 3 wt % to about 58 wt % ($SiO_2+TiO_2+ZrO_2$),
 from about 1 wt % to about 30 wt % $Bi_2O_3$,
 from about 0 wt % to about 30 wt % ($Nd_2O_3+Gd_2O_3+La_2O_3+Sm_2O_3$),
 from about 0.1 wt % to about 10 wt % ZnO,
 from about 0.1 wt % to about 10 wt % CuO, and
 from about 0.1 wt % to about 5 wt % LiF.

9. The fired electric or electronic component of claim 5, wherein the solids portion comprises:
 from about 14 wt % to about 25 wt % (BaO+CaO+SrO+MgO),
 from about 1 wt % to about 43 wt % ($Al_2O_3+B_2O_3$),
 from about 21 wt % to about 58 wt % ($SiO_2+TiO_2+ZrO_2$),
 from about 8 wt % to about 20 wt % $Bi_2O_3$,
 from about 0.1 wt % to about 20 wt % ($Nd_2O_3+Gd_2O_3+La_2O_3+Sm_2O_3$),
 from about 0.1 wt % to about 5 wt % ZnO,
 from about 0.1 wt % to about 5 wt % CuO, and
 from about 0.1 wt % to about 3 wt % LiF.

10. A fired electric or electronic component comprising a lead-free and cadmium-free dielectric paste composition together with a conductive paste comprising prior to firing:
 a. 60-90 wt % Ag+Pd+Pt+Au,
 b. 1-10 wt % of an additive selected from the group consisting of silicides, carbides, nitrides, and borides of transition metals,
 c. 0.5-10 wt % of at least one glass frit,
 d. 10-40 wt % of an organic portion,
 wherein the lead-free and cadmium-free dielectric paste composition comprises a solids portion, comprising:
  a. from about 5 wt % to about 50 wt % (BaO+CaO+SrO+MgO),
  b. from about 0.1 wt % to about 50 wt % ($Al_2O_3+B_2O_3$),
  c. from about 0.1 wt % to about 50 wt % ($SiO_2+TiO_2+ZrO_2$), and
  d. from about 0.1-40 wt % $Bi_2O_3$.

11. The fired electric or electronic component of claim 10, wherein the solids portion further comprises at least one selected from the group consisting of:
 e. from about 0.1 wt % to about 10 wt % ZnO,
 f. from about 0.1 wt % to about 30 wt % ($Nd_2O_3+Gd_2O_3+La_2O_3+Sm_2O_3$),
 g. from about 0.1 wt % to about 10 wt % CuO, and
 h. from about 0.1 wt % to about 10 wt % LiF.

12. A fired electric or electronic component comprising a lead-free and cadmium-free dielectric paste composition together with a conductive paste comprising prior to firing:
 a. 60-90 wt % Ag+Pd+Pt+Au,
 b. 1-10 wt % of an additive selected from the group consisting of silicides, carbides, nitrides, and borides of transition metals,
 c. 0.5-10 wt % of at least one glass frit,
 d. 10-40 wt % of an organic portion,
 wherein the lead-free and cadmium-free dielectric paste composition comprises a solids portion, comprising:
  a. from about 0.5 wt % to about 50 wt % BaO,
  b. from about 0 wt % to about 40 wt % CaO,
  c. from about 0 wt % to about 10 wt % SrO,
  d. from about 0 wt % to about 10 wt % ZnO,
  e. from about 0.1 wt % to about 20 wt % $B_2O_3$,
  f. from about 0 wt % to about 40 wt % $Al_2O_3$,
  g. from about 0 wt % to about 40 wt % $SiO_2$, h. from about 1 wt % to about 70 wt % $TiO_2$,
i. from about 0 wt % to about 30 wt % $Bi_2O_3$,
j. from about 0 to about 30 wt % $Nd_2O_3$,
k. from about 0 to about 40 wt % $Sm_2O_3$,
l. from about 0 to about 10 wt % CuO, and
m. from about 0 to about 10 wt % LiF.

13. The fired electric or electronic component of claim 12, wherein the solids portion comprises:
   a. from about 5 wt % to about 25 wt % BaO,
   b. from about 0 wt % to about 20 wt % CaO,
   c. from about 0 wt % to about 5 wt % SrO,
   d. from about 0 wt % to about 7 wt % ZnO,
   e. from about 0.5 wt % to about 25 wt % $B_2O_3$,
   f. from about 0 wt % to about 35 wt % $Al_2O_3$,
   g. from about 1 wt % to about 35 wt % $SiO_2$,
   h. from about 2 wt % to about 65 wt % $TiO_2$,
   i. from about 0 wt % to about 20 wt % $Bi_2O_3$,
   j. from about 0 to about 25 wt % $Nd_2O_3$,
   k. from about 0 to about 35 wt % $Sm_2O_3$,
   l. from about 0 to about 5 wt % CuO, and
   m. from about 0 to about 5 wt % LiF.

14. A fired electric or electronic component comprising a lead-free and cadmium-free dielectric paste composition together with a conductive paste comprising prior to firing:
   a. 60-90 wt % Ag+Pd+Pt+Au,
   b. 1-10 wt % of an additive selected from the group consisting of silicides, carbides, nitrides, and borides of transition metals,
   c. 0.5-10 wt % of at least one glass frit,
   d. 10-40 wt % of an organic portion,
wherein the lead-free and cadmium-free dielectric paste composition comprises a solids portion, comprising:
   a. from about 0.5 wt % to about 50 wt % BaO,
   b. from about 0.5 wt % to about 60 wt % $TiO_2$,
   c. from about 0.1 wt % to about 40 wt % $Bi_2O_3$,
   d. from about 0 wt % to about 30 wt % $SiO_2$,
   e. from about 0 wt % to about 30 wt % ZnO,
   f. from about 0.1 wt % to about 40 wt % $B_2O_3$,
   g. from about 0.1 wt % to about 30 wt % CuO, and
   h. from about 0.1 wt % to about 30 wt % LiF.

15. A method of producing an LTCC device comprising:
providing at least one substrate bearing a tape comprising a lead-free and cadmium-free dielectric paste composition, comprising a solids portion comprising:
   a. from about 0.5 wt % to about 50 wt % (BaO+CaO+SrO+MgO),
   b. from about 0.1 wt % to about 60 wt % ($Al_2O_3$+$B_2O_3$),
   c. from about 0.1 wt % to about 60 wt % ($SiO_2$+$TiO_2$+$ZrO_2$),
   d. from about 0 wt % to about 40 wt % $Bi_2O_3$,
   e. from about 0 wt % to about 35 wt % ($Nd_2O_3$+$Gd_2O_3$+$La_2O_3$+$Sm_2O_3$),
   f. from about 0 wt % to about 10 wt % ZnO,
   g. from about 0 wt % to about 10 wt % CuO, and
   h. from about 0 wt % to about 8 wt % LiF,
forming at least one via in the tape,
filling the at least one via with a conductive paste comprising:
   a. 60-90 wt % Ag+Pd+Pt+Au,
   b. 1-10 wt % of an additive selected from the group consisting of silicides, carbides, nitrides, and borides of transition metals,
   c. 0.5-10 wt % of at least one glass frit, and
   d. 10-40 wt % of an organic portion, and
firing the tape and conductive paste at a temperature up to 1000° C.

16. The method of claim 15, wherein the solids portion comprises:
   a. from about 5 wt % to about 25 wt % (BaO+CaO+SrO+MgO),
   b. from about 0.5 wt % to about 45 wt % ($Al_2O_3$+$B_2O_3$),
   c. from about 3 wt % to about 58 wt % ($SiO_2$+$TiO_2$+$ZrO_2$),
   d. from about 1 wt % to about 30 wt % $Bi_2O_3$,
   e. from about 0 wt % to about 30 wt % ($Nd_2O_3$+$Gd_2O_3$+$La_2O_3$+$Sm_2O_3$),
   f. from about 0.1 wt % to about 10 Wt % ZnO,
   g. from about 0.1 wt % to about 10 wt % CuO, and
   h. from about 0.1 wt % to about 5 wt % LiF.

17. The method of claim 15, wherein the solids portion comprises:
   a. from about 14 wt % to about 25 wt % (BaO+CaO+SrO+MgO),
   b. from about 1 wt % to about 43 wt % ($Al_2O_3$+$B_2O_3$),
   c. from about 21 wt % to about 58 wt % ($SiO_2$+$TiO_2$+$ZrO_2$),
   d. from about 8 wt % to about 20 wt % $Bi_2O_3$,
   e. from about 0.1 wt % to about 20 wt % ($Nd_2O_3$+$Gd_2O_3$+$La_2O_3$+$Sm_2O_3$),
   f. from about 0.1 wt % to about 5 wt % ZnO,
   g. from about 0.1 wt % to about 5 wt % CuO, and
   h. from about 0.1 wt % to about 3 wt % LiF.

18. The method of claim 15, wherein the solids portion comprises:
   a. from about 10 wt % to about 28 wt % (BaO+CaO+SrO+MgO),
   b. from about 1 wt % to about 13 wt % ($Al_2O_3$+$B_2O_3$),
   c. from about 22 wt % to about 58 wt % ($SiO_2$+$TiO_2$+$ZrO_2$)
   d. from about 9 wt % to about 19 wt % $Bi_2O_3$,
   e. from about 0 wt % to about 28 wt % ($Nd_2O_3$+$Gd_2O_3$+$La_2O_3$+$Sm_2O_3$),
   f. from about 1 wt % to about 5 wt % ZnO,
   g. from about 0.1 wt % to about 3 wt % CuO, and
   h. from about 0.5 wt % to about 3 wt % LiF.

19. The method of claim 15, wherein the solids portion comprises:
   a. from about 0.5 wt % to about 50 wt % BaO,
   b. from about 0 wt % to about 40 wt % CaO,
   c. from about 0 wt % to about 10 wt % SrO,
   d. from about 0 wt % to about 10 wt % ZnO,
   e. from about 0.1 wt % to about 20 wt % $B_2O_3$,
   f. from about 0 wt % to about 40 wt % $Al_2O_3$,
   g. from about 0 wt % to about 40 wt % $SiO_2$,
   h. from about 1 wt % to about 70 wt % $TiO_2$,
   i. from about 0 wt % to about 30 wt % $Bi_2O_3$,
   j. from about 0 to about 30 wt % $Nd_2O_3$,
   k. from about 0 to about 40 wt % $Sm_2O_3$,
   l. from about 0 to about 10 wt % CuO, and
   m. from about 0 to about 10 wt % LiF.

20. The method of claim 15, wherein the solids portion comprises:
   a. from about 5 wt % to about 25 wt % BaO,
   b. from about 0 wt % to about 20 wt % CaO,
   c. from about 0 wt % to about 5 wt % SrO,
   d. from about 0 wt % to about 7 wt % ZnO,
   e. from about 0.5 wt % to about 25 wt % $B_2O_3$,
   f. from about 0 wt % to about 35 wt % $Al_2O_3$,
   g. from about 1 wt % to about 35 wt % $SiO_2$,
   h. from about 2 wt % to about 65 wt % $TiO_2$, i. from about 0 wt % to about 20 wt % $Bi_2O_3$,
j. from about 0 to about 25 wt % $Nd_2O_3$,
k. from about 0 to about 35 wt % $Sm_2O_3$,
l. from about 0 to about 5 wt % CuO, and
m. from about 0 to about 5 wt % LiF.

* * * * *